United States Patent
Parker

(10) Patent No.: US 8,116,994 B2
(45) Date of Patent: Feb. 14, 2012

(54) METHOD FOR LOCATING AN UNDERGROUND SEPTIC TANK, CONDUIT, OR THE LIKE USING INJECTION/DETECTION SYNCHRONIZATION OF AN ACOUSTIC SIGNAL AND DIGITAL SIGNAL PROCESSING

(76) Inventor: David H. Parker, Earlysville, VA (US)

( * ) Notice: Subject to any disclaimer, the term of this patent is extended or adjusted under 35 U.S.C. 154(b) by 416 days.

(21) Appl. No.: 12/276,350

(22) Filed: Nov. 23, 2008

(65) Prior Publication Data

US 2009/0112476 A1   Apr. 30, 2009

(51) Int. Cl.
G01F 17/00 (2006.01)
G01C 17/00 (2006.01)

(52) U.S. Cl. .......................................... 702/56; 702/150
(58) Field of Classification Search ................. 702/6, 56, 702/159
See application file for complete search history.

(56) References Cited

U.S. PATENT DOCUMENTS

| | | |
|---|---|---|
| 2,688,124 A | 8/1954 | Doty |
| 2,808,577 A | 10/1957 | Crawford |
| 2,874,795 A | 2/1959 | Doty |
| 2,910,134 A | 10/1959 | Crawford |
| 2,989,726 A | 6/1961 | Crawford |
| 3,209,322 A | 9/1965 | Doty |
| 3,904,228 A | 9/1975 | Maroschak |
| 4,309,576 A | 1/1982 | Corrigan |
| 4,486,866 A | 12/1984 | Muir |
| 4,823,328 A | 4/1989 | Conklin |
| 4,911,012 A | 3/1990 | Ziska |
| 5,027,644 A | 7/1991 | Ziolkowski |
| 5,281,024 A | 1/1994 | Fons |
| 5,350,887 A | 9/1994 | Sandstrom |
| 5,412,989 A | 5/1995 | Eberle |
| 5,487,432 A | 1/1996 | Thompson |
| 5,553,498 A | 9/1996 | Zelczer |
| 6,003,376 A | 12/1999 | Burns |
| 6,400,646 B1* | 6/2002 | Shah et al. ........................ 367/82 |
| 6,530,263 B1* | 3/2003 | Chana ......................... 73/40.5 R |
| 6,532,194 B2 | 3/2003 | Auesmith |
| 6,679,120 B1 | 1/2004 | Cribbs |
| 6,774,839 B2 | 8/2004 | Talbot |
| 7,221,136 B2 | 5/2007 | Olsson |
| 7,324,615 B2 | 1/2008 | Lourens |
| 7,336,078 B1 | 2/2008 | Merewether |
| 2008/0047329 A1* | 2/2008 | Breed .......................... 73/61.41 |
| 2011/0006772 A1* | 1/2011 | Olsson et al. .................. 324/326 |

OTHER PUBLICATIONS

"Mode of Vibration", AzimaDLI, 2009.*
The Physics Classroom, "Resonance", 1999.*
Source file of the Physics Classroom, "Resonance", 1999.*
Abstract of Bendat et al., "Engineering Applications of Correlation and Spectral Analysis", 1980.*
Abstract of Oppenheim et al., "Digital Signal Processing", 1975.*

(Continued)

Primary Examiner — Michael Nghiem
(74) Attorney, Agent, or Firm — David H. Parker

(57) ABSTRACT

A non-invasive method for easily locating an underground septic tank, distribution box, field line, conduit, or underground cavity is disclosed. In a preferred embodiment, prescribed acoustic signals are injected into an underground cavity via an accessible port and remotely detected by a time synchronized detector in contact with the ground which cross correlates the detected signal with a duplicate of the prescribed acoustic signal in order to reject background noise, and thus locate the underground cavity. A frequency sweep is conducted to exploit cavity resonance modes and thus further enhance the signal to noise ratio.

15 Claims, 6 Drawing Sheets

OTHER PUBLICATIONS

University of Minnesota Extension Service Publication PC-06583. revised 2006, recovered from the internet Jul. 14, 2008 http://www.extension.umn.edu/distribution/naturalresources/components/6583-06.html.

Physics for Scientist and Engineers, Chapter 14 (Sound), Tipler, Third Edition, Worth Publishers, 1991.

Engineering Applications of Acoustics. section 3.3.4.2. Kleppe, Artech House, Norwood, MA., 1989.

Lock-in Amplifiers Go Digital, Lasers & Optronics, Apr. 1991.

\* cited by examiner

METHOD FOR LOCATING AN UNDERGROUND SEPTIC TANK, CONDUIT, OR THE LIKE USING INJECTION/DETECTION SYNCHRONIZATION OF AN ACOUSTIC SIGNAL AND DIGITAL SIGNAL PROCESSING

FIELD OF INVENTION

This invention relates to a non-invasive method for easily locating an underground septic tank, distribution box, field line, conduit, fuel tank, or the like.

BACKGROUND OF THE INVENTION

Locating a septic tank, distribution box, and field lines can be a frustrating and expensive experience for a homeowner and even for a professional septic service company. The University of Minnesota Extension service publication PC-06583, incorporated by reference herein, recommends tracing the sewer pipe exit from the house, and then with a rod or probe poking around in the soil 10 to 15 feet from the foundation of the house. The University also suggests that a metal detector may be of assistance since concrete septic tanks may contain metal reinforcing rods. However, modern fiberglass tanks will not contain any metal. The University suggests looking for greener grass, depressions, mounds, or wet spots to find the field lines.

These techniques are ratified as state-of-the-art by eHOW in *How to Find a Septic Tank*; The Laundry Alternative Inc. in *How to Locate a Septic Tank*; and A-1 Cesspool Service Inc. in *Locating your Septic Tank*: all three of which are incorporated by reference herein. A homeowner will typically use a hammer and piece of pipe or rebar as a probe. A commercial septic service will usually have a tool with a handle, such as the Subsurface Tool of Thompson in U.S. Pat. No. 5,487,432, incorporated by reference herein. Some incorporate a driver similar to a metal fence post driver with a built-in sliding hammer.

Once the septic tank is located, the distribution box location may be narrowed down by proximity to the septic tank or running a fish tape through the discharge pipe and listening for the tape hitting the box. Locating the plastic or clay pipe field lines is more of a problem.

In U.S. Pat. No. 5,281,024, incorporated by reference herein, Fons discloses a Method for Locating Porus and Permeable Soils Employing Earth Surface Temperatures.

In U.S. Pat. No. 4,309,576, incorporated by reference herein, Corrigan discloses a Listening Device for Locating Underground Water Leakages, wherein an acoustic pick-up coupled to an amplifier-receiver, level meter, and headphone is used to probe the earth for the maximum signal strength.

In U.S. Pat. No. 4,911,012, incorporated by reference herein, Ziska discloses a Sewer Line Detection System wherein sound is injected into the pipe, and a listening device and sound meter is coupled to the earth to locate the line.

In U.S. Pat. No. 6,003,376, incorporated by reference herein, Burns et al. discloses an Acoustic System for Measuring the Location and Depth of Underground Pipe wherein sound is injected into a pipe and an array of transducers coupled to a computer locates the pipe.

In U.S. Pat. No. 6,679,120, incorporated by reference herein, Cribbs et al. discloses a System and Method for Guided Boring Obstacle Detection, wherein a drill head generates sound detected by an array of detectors to detect the presence or absence of an underground obstacle, such as a pipe.

In U.S. Pat. No. 7,336,078, incorporated by reference herein, Merewether et al. discloses Multi-Sensor Mapping Omnidirectional Sonde and Line Locators wherein a sonde can be attached to a push cable or line, or self-contained in a flushed transmitter such as U.S. Pat. No. 7,221,136, incorporated by reference herein, disclosed by Olsson et al.

The aforementioned methods are either trial-and-error, costly, or technically sophisticated. Moreover, there is no known use of the combination of synchronous detection with exploitation of acoustic resonance of a cavity to enhance the signal to noise ratio.

There is a need for a simple and economical instrument for locating underground utilities, such as, but not limited to, a septic system. Such an instrument is disclosed herein which is within the operational capability, and cost limitations, of a homeowner, septic service, or rental service.

BRIEF SUMMARY OF THE INVENTION

Disclosed herein is an invention for finding underground cavities such as a septic tank. Using the principles of acoustic resonance, a driving signal is injected into the cavity via an accessible port, such as a toilet. The signal is detected outside and digitally processed to indicate the signal strength, which allows one to probe for the maximum signal strength, i.e., location of the cavity. In very simple cases, the detection may be made without the aid of electronics.

DETAILED DESCRIPTION OF THE INVENTION

Resonance

Figure 1:
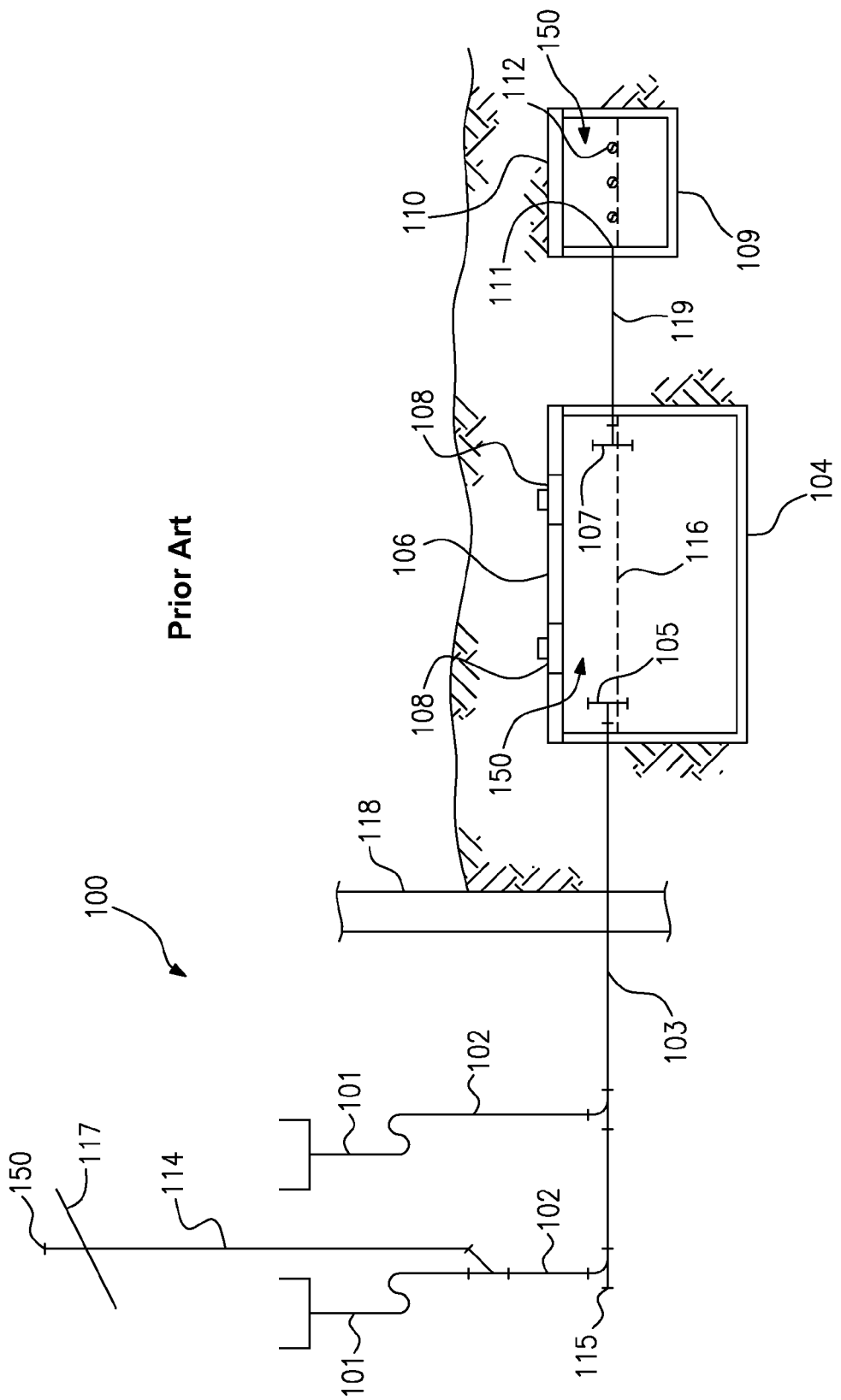
FIG. 1 is a schematic elevation view of a typical septic system.

Resonance is a well known phenomenon of sound waves whereby a cavity can be driven at natural frequencies for at least a time equal to 2/f, where f is the frequency, to produce amplified vibrations. This is a topic covered in most introductory physics books, such as the classic college text *Physics For Scientist and Engineers* by Tipler. Chapter 14 (Sound), of the Third Edition of Tipler is incorporated by reference herein.

For a closed cavity, such as a septic tank or pipe, the natural frequencies corresponding to the allowed modes will be at harmonic wavelengths corresponding to integral half wavelengths spaning the cavity, i.e., $$L = n\frac{\lambda_n}{2} \quad (1)$$
$$n = 1, 2, 3,$$

where L is the length of the cavity and $\lambda_n$ is the wavelength of the sound wave for mode n. For one end open and one end closed, the natural frequencies will also be spaced by harmonics of integral half wavelengths, but offset to wavelengths corresponding to odd quarter wavelengths of the cavity, i.e., $$L = n\frac{\lambda_n}{4} \qquad (2)$$
$$n = 1, 3, 5,$$

For both ends open, the natural frequencies are the same conditions as both ends closed, with a minor correction factor. The wavelength λ is $$\lambda = \frac{v}{f} \qquad (3)$$

where v is the speed of sound and f is the frequency. At standard pressure and temperature, the speed of sound in air v is approximately 331 m/s. Thus for a closed cavity 2 m long, such as the length of a septic tank, the lowest natural frequency in air would be $$f_1 = \frac{v}{\lambda_1} = \frac{v}{2L/1} \approx 82.75 \text{ Hz} \qquad (4)$$

with higher harmonics $f_2$=165.5 Hz, $f_3$=248.25 Hz, etc. It will be recognized that the nominal audio frequency range is 20 to 20 000 Hz, so such vibrations could possibly be heard by a person as a low frequency sound depending on the amplitude, background noise, and acoustic coupling, i.e., it may be necessary to place an ear against the ground.

It will be understood by those skilled in the art that the speed of sound v depends on temperature, pressure, gas composition, and other factors known in the art, resulting in dispersion, i.e., slightly different speeds of sound for the different frequencies. It will also be understood by those skilled in the art that many resonant modes are possible.

For example, the natural frequencies between the sides of a septic tank will probably be a shorter dimension, and thus will resonate at a higher frequency, and the vertical distance between the top of the water and the tank cover will probably be only a fraction of a meter, and thus that mode will be at yet a higher fundamental frequency.

For example, if the distance from the top of the water to the lid is 254 mm (10 inches), from equation 1; $f_1$≈651 Hz, $f_2$≈1302 Hz. It will also be understood that a pipe between a septic tank and distribution box, open at both ends, will also be governed by equation 1 and will most likely be of the order of a few meters; whereas the length of a field line will be tens of meters or longer. For example, from equation 2, a 20 meter field line open at the distribution box end and closed at the distal end would resonate at $f_1$≈4.1 Hz, $f_3$≈12.4 Hz, etc.

It will be recognized by those skilled in the art that a septic tank lid vibrating in resonance will act as a large piston coupling significant vibrational energy into the earth cover.

Signal Processing

It will be understood by those skilled in the art that a septic system will resonate in many modes, the frequencies of which will be almost impossible to predict with precision. However, it is clear that the resonant modes will be between the order of 1 Hz, for the fundamental mode of the field lines, to the audio frequency for higher harmonics and the septic tank lid in the vertical direction. It will also be understood that attenuation of the earth cover will in general make detection of these waves difficult particularly in the presence of background noise such as vehicle traffic, air conditioners, insects, 120 Hz hum of electric power transformers, etc.

There are well known signal processing techniques for detecting signals in the presence of noise which can be brought to the problem, however. In particular, cross correlation is a standard technique taught in standard textbooks on digital signal processing such as *Digital Signal Processing* by Oppenheim and Schafer. A strong mathematical treatment is provided in *Engineering Applications of Correlation and Spectral Analysis* by Bendat and Piersol. In *Engineering Applications of Acoustics*, Kleppe describes Cross-Correlation Detection in section 3.3.4.2, which is incorporated by reference herein. Cross correlation $R_{xy}(\tau)$ is defined $$R_{xy}(\tau) = \lim_{T \to \infty} \frac{1}{T} \int_0^T x(t)y(t+\tau)dt \qquad (5)$$

where x(t) and y(t+τ) are functions of time t over observation time T and τ is the delay.

For sampled data signals, this can be approximated by $$R_{xy}(r) = \frac{1}{N-r}\sum_{n=1}^{N-r} X_n Y_{n+r} \qquad (6)$$
$$r = 0, 1, 2,$$

where N is the total number of consecutive samples of $X_n$ and $Y_n$, analogous to T, and r is the number of sample lags, analogous to τ.

It will be understood by those skilled in the art that the magnitude of $R_{xy}(r)$ is an indication of the match, or the degree of correlation, between signals $X_n$ and a delayed signal $Y_{n+r}$ at a given delay or lag r; and the lag r at which the maximum value of $R_{xy}(r)$ occurs is an indication of the delay time at which the signals are best correlated.

For example, if $X_n$ is a sound signal generated by a digital-to-analog converter and played over a speaker, and $Y_n$ is the detected sound of a microphone 10 meters across the room, the propagation delay would be around 30 ms. If the sound is sampled at 20 kHz, it would propagate 10 meters in 600 samples (lags r=600). The sound produced by the speaker at $X_0$ would be similar to the detected sound sample $Y_{600}$, or, $R_{xy}(r)$ will be a maximum at $R_{xy}(600)$. However, if $Y_{n+r}$ is not correlated with $X_n$, such as a cricket sound, the cross correlation between the music and cricket sound will in general be much less for all values of r. Thus the cross correlation signal processing "picks out" the sound component due to $X_n$, and the value of r at which it is maximized is an indication of the lag, or delay.

Consider a sound x(t) introduced into a system of connected cavities and pipes, such as, but not limited to, a septic system. A detector in communication with the system, such as a microphone, geophone, or accelerometer in contact with the ground, will detect the signal along with background noise q(t) as y(t). Assume y(t) is a combination of noise q(t) and the signal x(t) modified by a transfer function g(f)

$$y(t)=g(f)x(t)+q(t) \qquad (7)$$

or for the sampled signal $$Y_n=g(f)X_n+Q_n \qquad (8)$$

where g(f) is a frequency dependent transfer function. As explained hereinabove, the response g(f) of the system will be frequency dependent based on resonance and other factors such as attenuation and dispersion, e.g., a square wave introduced into the system will be distorted, and g(f) will be large at resonant frequencies and smaller at attenuated frequencies, depending on the physics of the specific system under test.

It will be understood by those skilled in the art that despite distortions and attenuation, there will still be a strong correlation between x(t) and y(t) and through signal processing techniques, such as cross correlation described hereinabove, background noise q(t) may be rejected in order to better detect a component due to the distorted and attenuated driving signal x(t). Equation 6 can be rewritten as $$R_{xy}(r) = \frac{1}{N-r}\sum_{n=1}^{N-r} X_n g(f) X_{n+r} + \frac{1}{N-r}\sum_{n=1}^{N-r} X_n Q_{n+r} \quad (9)$$

$$r = 0, 1, 2,$$

If there is no correlation between $X_n$ and $Q_n$ $$\frac{1}{N-r}\sum_{n=1}^{N-r} X_n Q_{n+r} \approx 0 \quad (10)$$

or $$R_{xy}(r) \approx \frac{1}{N-r}\sum_{n=1}^{N-r} X_n g(f) X_{n+r} \quad (11)$$

It will be recognized by those skilled in the art that the transfer function g(f) for the system could be derived from measurements and many characteristics of the physical system could be determined from a knowledge of g(f).

It will also be recognized by those skilled in the art that cross correlation is only one of many techniques used to extract a signal from the noise. For example, digital lock-in amplifiers are described by Baylor et al. of Stanford Research Systems Inc. in *Lock-in Amplifiers Go Digital*, Lasers & Optronics, April 1991, and in Stanford Research Systems Application Note #3, *About Lock-In Amplifiers*, both of which are incorporated by reference herein.

Time Synchronization

In order to perform signal processing on a combined driving signal x(t) and a remotely detected signal y(t), it is necessary to synchronize the time reference between the two components to a fraction of the total lag interval in order to achieve coherence. For the problem at hand this would require an accuracy of the order of 1 ms. It will be recognized by those skilled in the art that there are many ways to accomplish such synchronization. While it is not necessary to synchronize to an absolute time reference, techniques and hardware are readily available to synchronize to broadcast time references. For example, The National Institute of Standards and Technology, NIST, broadcast time references on stations WWV, WWVB, and WWVH. The specifications are described in NIST Special Publication 432, 2002 Edition, *NIST Time and Frequency Services* by Lombardi, which is incorporated by reference herein.

U.S. Pat. No. 4,823,328 to Conklin et al.; U.S. Pat. No. 6,532,194 to Auesmith; and U.S. Pat. No. 7,324,615 to Lourens et al.; all three of which are incorporated by reference herein, teach such means for synchronizing to radio broadcast. U.S. Pat. No. 6,774,839 to Talbot et al., incorporated by reference herein, teaches synchronization to broadcast from global positioning satellites, GPS.

It will be recognized by those skilled in the art that many other ways are available for synchronizing the time reference between components, such as an audio generator and a remote detector, including, but not limited to; crystal controlled clocks, wire or fiber connections that can be used for initialization or maintained connections, modems operating over the power line, telephone interface, cell phone interface, wireless phone, wireless remote controls, the internet, wireless local area network connections commonly available on Personal Computers, etc. It will also be recognized that the most economical system, for a consumer product, would be autonomous operation, i.e., without communications between the generator and remote detector. However, a more professional version could benefit by communications between units to dynamically change the driving function based on measured data to reduce the time required to perform the measurements, e.g., center the sweep frequency on a band around the detected peak or settle on a single resonant frequency.

Septic System

One preferred embodiment would be employed to locate a septic system. It will be understood that the invention is not limited to a septic system, but is merely used to illustrate the principles of the invention as a pedagogical example. Once understood, other applications and adaptions will be recognized by those skilled in the art.

Turning now to the drawings to better understand the invention, where like elements are identified by the same reference numbers throughout the figures. It should be understood that the depicted embodiments are illustrative to facilitate understanding the spirit and principles of the invention and not limiting in any way.

A typical septic system 100, shown as an elevation view in FIG. 1, comprises a plurality of house drains 101 connected to sewer lines 102 collecting wastewater. The sewer lines 102 converge into a main line 103 from the house 118 to a septic tank 104 entrance tee 105 such as described in U.S. Pat. No. 3,904,228 to Maroschak, incorporated by reference herein. The septic tank 104 comprises a lid 106, an entrance tee 105, an exit tee 107, and access hatches 108 at the entrance and exit ends. The exit tee 107 maintains the liquid level 116 about 10 inches below the tank cover 106.

Figure 2:
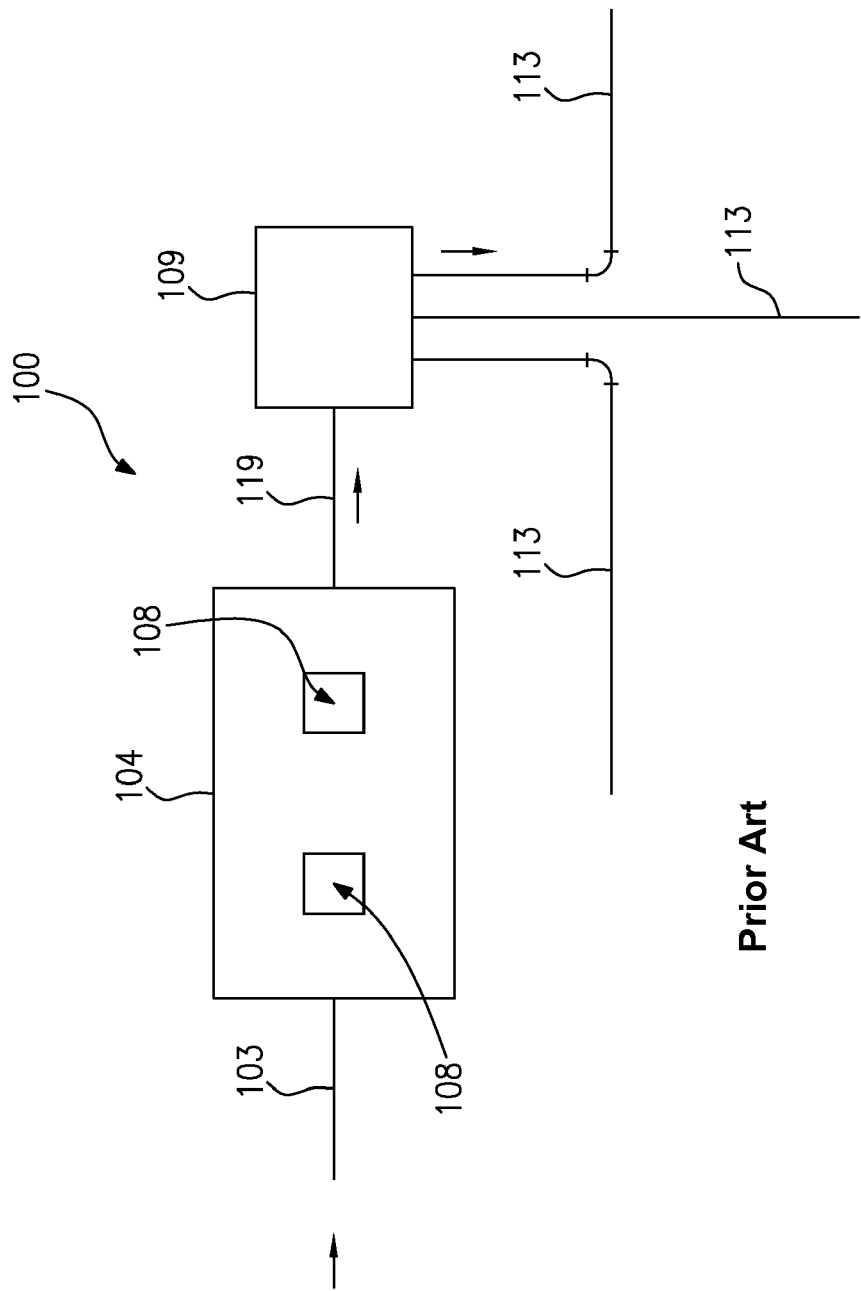
FIG. 2 is a schematic plan view of a typical septic system.

The exit tee 107 is connected to an outlet pipe 119 which connects to a distribution box 109 with a lid 110, an entrance 111 and a plurality of exit pipes 112 leading to a plurality of field lines 113 shown in a plan view in FIG. 2. The exit pipes 112 are balanced in order to distribute the wastewater approximately equally between the field lines. The entrance 111 and exits 112 to the distribution box maintain the liquid level below the top 110 of the distribution box 109 and below the liquid level 116 of the septic tank 104, i.e., the septic tank exit line 119 is typically not flooded to the distribution box 109. The house drains are vented to a roof 117 vent stack 114 which provides a clear vent back to the septic tank 104, distribution box 109, and field lines 113. The house drains and main line typically include cleanout fittings 115 for servicing the system.

In typical operation, the lines maintain a clear air pathway between the vent stack 114 and septic tank 104, i.e., there is an air communication path from the vent stack 114 to the field lines 113. This air communication path will hereinafter be referred to as the channel 150. Septic gasses from the wastewater are prevented from entering into the house by liquid traps in the drains, i.e., the water in the toilet bowl and traps under the sinks prevent sewer gas from entering the house from the channel 150.

It will be recognized by those skilled in the art that the invention is not limited to field lines 113, e.g., a system on a public sewer service, which has no septic tank, could use the invention to trace the line from the house to the public connection in the same manner as locating a field line.

Sound Generator

Figure 3:
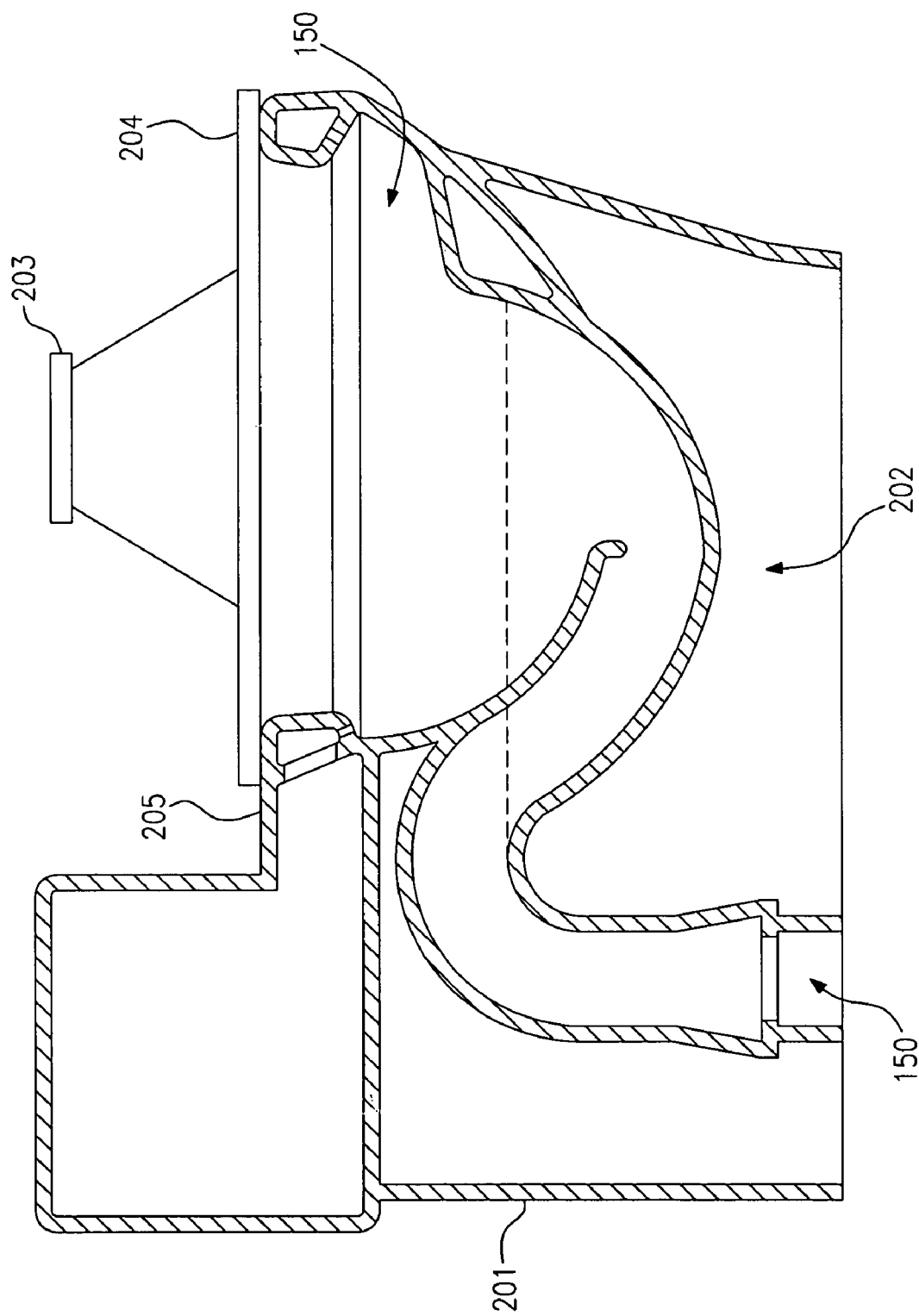
FIG. 3 is a section view of a toilet with a speaker mounted in communications with the channel.

Nondestructive access to the channel 150 can be made via the vent stack 114, a cleanout 115, or a drain. For example, the water in a toilet 201 bowl trap 202, shown in FIG. 3, may be easily removed using a plunger, shop vacuum, pump, rags, or any other means known in the art for removing water. Removing the water trap from a toilet 201 provides a large (typically a 4 inch pipe) clear communications entrance to the channel 150, through which a sound signal x(t) can be introduced into the septic system 100.

Figure 4:
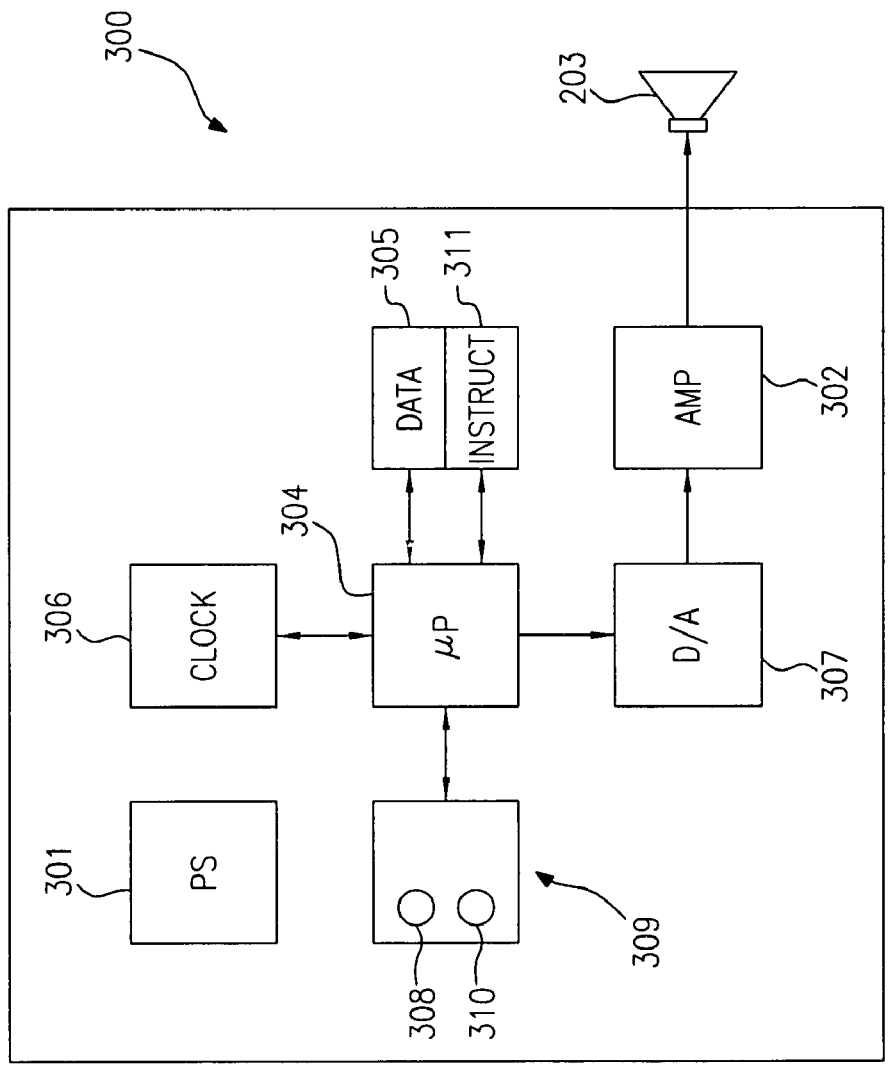
FIG. 4 is a block diagram of the driving electronics package.

For example, a speaker 203 could be attached to a base 204 which would cover the toilet rim 205 placing the speaker 203 in communications with the channel 150. A driving electronics package 300, shown in FIG. 4, comprising a power supply 301, audio frequency amplifier 302, processor 304, data storage 305, time synchronization system 306, digital to analog converter 307, amplitude control 308, operator interface 309, function selector 310, and software 311 configured to generate a predefined driving signal in a prescribed sequence.

It will be recognized by those skilled in the art that devices other than speakers could be used to generate sound waves, such as a mechanical pressure generator. For example, in U.S. Pat. No. 5,350,887, incorporated by reference herein, Sandström teaches a Method and Apparatus for the Generation of Low Frequency Sound using rotors.

It will also be recognized by those skilled in the art that other devices, such a sirens, use mechanical modulators to produce pressure waves. For example, the discharge of a shop vacuum could be equipped with a modulating rotor with alternating holes and blockages driven by a speed controlled motor to produce modulated puffs of air. Such a device may be particularly suitable to excite very low frequency vibrations such as the fundamental frequency of a septic field line, large drainage pipe, adaption to a manhole, etc. It will also be recognized that explosion proof devices may be adapted for applications such as locating buried fuel storage tanks.

From the disclosed teachings herein those skilled in the art would recognize how to adapt the salient principles to alternative mechanical means (rather than an electronic digital to analog converter driving a speaker) for producing sound in a predefined manor, synchronized with the detector, such as a servo controlled mechanical drive, thereby preserving the spirit of the invention. For example, a mechanical chopper wheel is synchronized in a lock-in amplifier for optical measurements.

Detector

Figure 5:
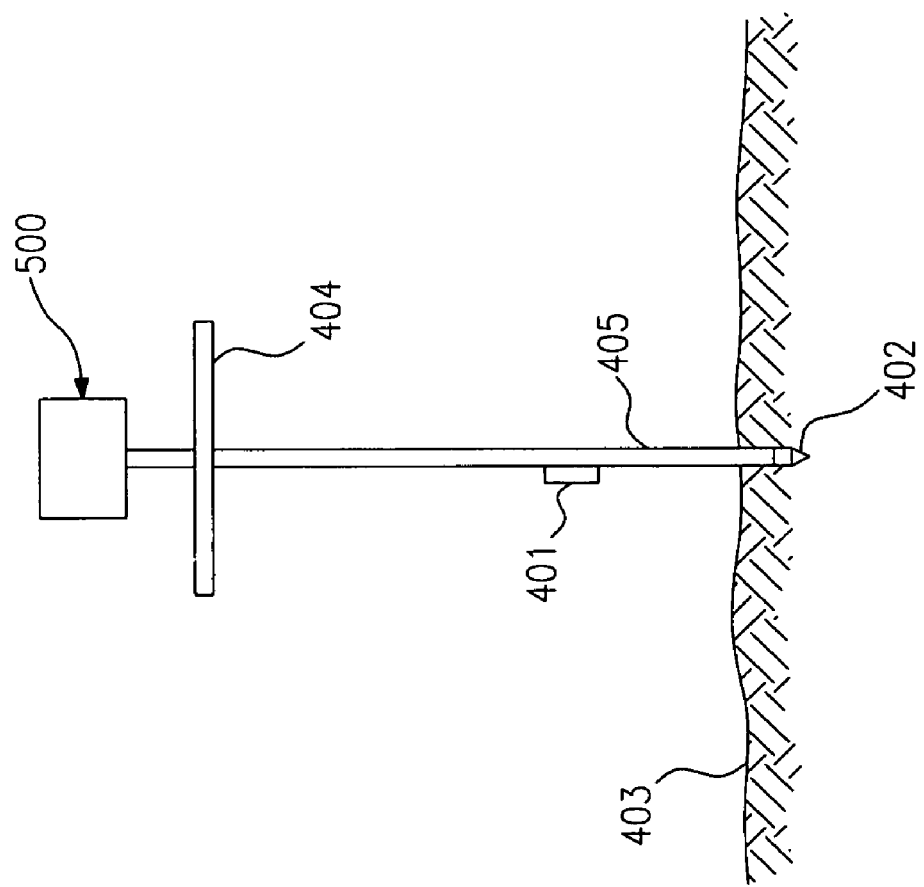
FIG. 5 shows a probe with the detecting electronics package.

The most common way to detect low frequency vibrations is by a geophone, as used in acoustic geological work, or an accelerometer, as taught by Corrigan, Ziska, and Cribbs et al. in U.S. Pat. No. 4,309,576, U.S. Pat. No. 4,911,012, and U.S. Pat. No. 6,679,120 respectively; all of which are incorporated by reference hereinabove. For example, an accelerometer 401 can be attached to a handled probe 402, as shown in FIG. 5, pressed against, or stuck into, the ground 403. A probe 402, such as described by Thompson in U.S. Pat. No. 5,487,432, which is incorporated by reference hereinabove, could be adapted with an accelerometer 401 on shaft 405. The probe 402 could be pushed into the ground 403 in order to allow the operator to release contact with the handle 404 and thus reduce operator induced vibrations such as due to heartbeat, breathing, talking, etc.

Figure 6:
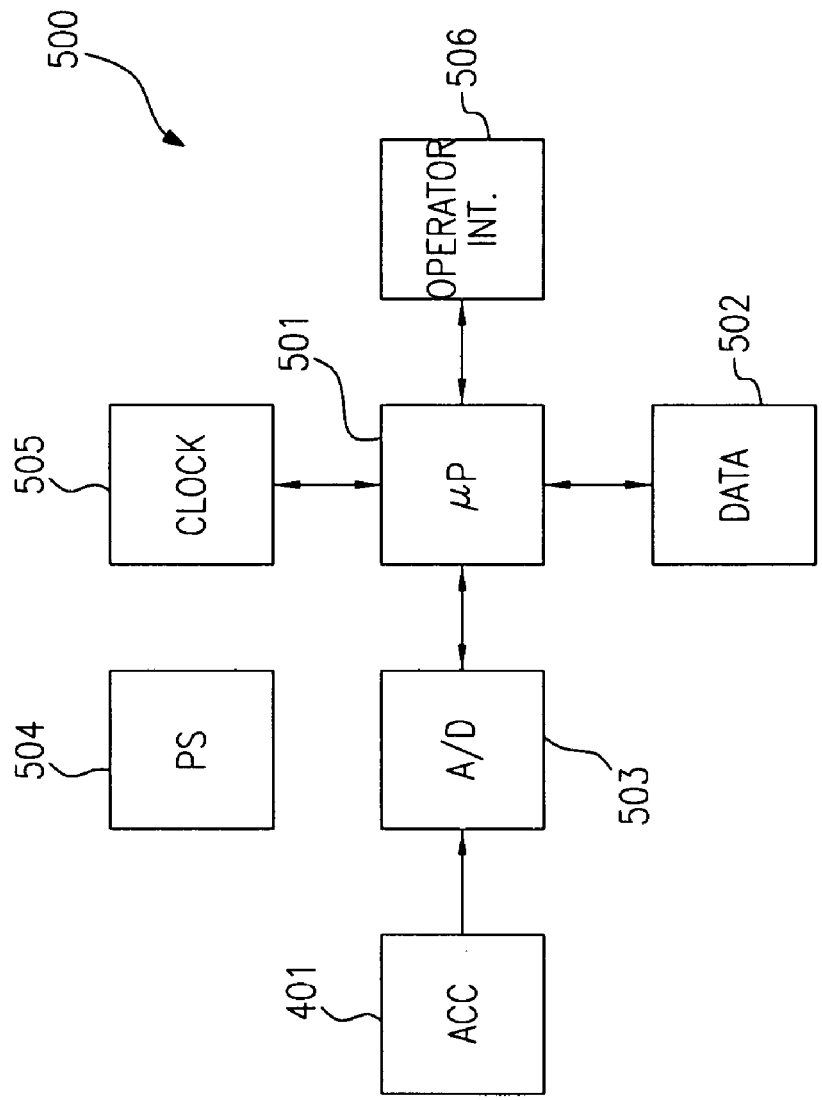
FIG. 6 is a block diagram of the detecting electronics package.

Such a probe 402 could be equipped with a detecting electronics package 500, shown in FIG. 6 comprising a processor 501, data storage 502, analog to digital converter 503, power supply 504, reference time source 505, accelerometer 401, and operator interface 506; to detect and sample sound vibrations y(t) which are synchronized in time with a driving sound signal x(t) introduced into the channel by driving electronic package 300.

By using a predefined driving signal x(t), the detecting electronics package 500 could cross correlate the sampled detected signal $Y_n$ with the a priori known driving signal $X_n$ to detect the amplitude of $R_{xy}(r)$ and the lag value r at which the maximum occurred. By moving the probe, the operator could determine if the probe is getting closer or farther away by noting the change in amplitude of $R_{xy}(r)$. It will be recognized by those skilled in the art that the operator interface 506 of the detecting electronics package 500 could be an audio signal such as a tone to indicate relative signal value, analog or digital instrument display, etc. It will also be recognized that a signal sensitivity range selection may be useful in order to cover a broad range of scales, e.g., start at a high sensitivity and reduce the sensitivity as the operator zooms in on the correct location, e.g., a septic tank lid 106 vibrating like a drum head.

In order to exploit resonance as described hereinabove, the driving sound signal x(t) produced by driving electronics package 300 could be a predefined sequence of tones, such as a stairstep function, or a frequency sweep over a range of tones. In such a case, where the frequency is a function of time f(t), the transfer function g(f) will become a function of time also, i.e., g(f(t)).

By modulating the driving frequency, the system will pass through modes where g(f(t)) is large and the system will sing. Depending on the power of the acoustic signal and the channel specifics, in some cases the vibrational modes may be directly detectable by sound or feel by a human or animal such as a trained dog. Vibrations may also be detectable by a simple pan of water resting on the ground and observing ripples on the water.

In the simplest case, all that would be needed would be a standard home stereo audio system with a CD, MP3, or the like, recording of repeated frequency sweeps and a speaker adapted to fit on a toilet, i.e., the invention could be practiced without all of the components disclosed herein.

It will also be recognized that the operator may need to modify the signal shape of $X_n$ in order to selectively differentiate between the lower frequency sounds produced by a field line 113 vs the higher frequency sounds produced by the septic tank lid 106 or exploit other knowledge of the transfer function g(f). Moreover, it will be recognized that resonant vibrational modes may harm pipes by inducing vibrations strong enough to shake joints loose, so a manual or automatic amplitude control may be necessary.

For example, an operational sequence may prescribe that every minute, on the minute; as set by driving electronics package 300 time synchronization system 306 and detecting electronics package 500 reference time source 505; x(t) drives a sound generator in communications with the channel with a linear ramp function from 1 Hz to 10 kHz over a period of 55 seconds, leaving 5 seconds for the sound to attenuate before repeating the cycle.

As the generator sweeps through the frequencies, various modes in the septic system will be excited as governed by g(f(t)). The detection electronics package 500 would digitize the signal $Y_n$ starting on the minute, for 55 seconds. The sample frequency would need to be above the Nyquist frequency, or around 20 kHz for a 10 kHz maximum frequency sweep, or a value of τ corresponding to 50 µs between samples, or lags. This would require about 2.2 MB of storage for 16 bit digitization which is easily within the state-of-the-art for consumer electronics. For the speed of sound of 331 m/s, and a typical septic system, the total lag time for the correlation would need be of the order of 1 second, or 20 000 lags, i.e., r=0, 1, 2, 3, ... 20 000 and N=1 100 000 samples of y(t) in equation 6.

The signal $Y_n$ would then be cross correlated, as in equation 6, with the stored values, or equation, for $X_n$ to produce r or 20 000 values of $R_{xy}(r)$. The electronics package 500 would then determine the maximum value from the set $R_{xy}(0)$, $R_{xy}(1)$, $R_{xy}(2)$, $R_{xy}(3)$, ... $R_{xy}(20\,000)$; and the delay r at which the maximum occurred. This would be communicated to the operator via the operator interface 506. Based on the change from the previous measurement, the operator would move the probe in the direction of the increasing signal.

It will be recognized by those skilled in the art that for a more economical consumer product; the number of lags, the frequency range, integration time, and sampling rate may be optimized thereby reducing the hardware expenses. For example, it is not absolutely necessary to calculate the lower lags such as $R_{xy}(0)$ since this would be a maximum in the trivial case where the signal generator and detector are at the same location. Also, for a residential system <<331 m in length, the number of lags could be greatly reduced, which may allow a slower processor to be used. In the simplest case, all the homeowner would need to purchase would be a CD with a sound generating function. He would adapt a home stereo system as the sound generator.

Operation

In one embodiment of the invention, an operator desiring to locate a septic tank would; lift the toilet lid and seat exposing the rim, remove the water from the toilet bowl, and place a speaker mounting over the toilet rim placing the speaker in closed communication with the channel. The driving electronics package would be turned on and it would establish a time reference from a broadcast signal such as WWV. The operator would select a generating function (sweep, stairstep, etc.) and adjust the volume. It would then begin a prescribed cycle of generating sound wave into the channel.

Leaving the generator unattended, the operator would then switch on the detector which would establish a time reference from the same WWV broadcast, select the same generating function, and begin taking data on the next minute mark, which would then be cross correlated to produce a reading of the maximum value every minute. The operator would then begin probing the ground in the more likely locations for the septic tank and proceed to move the probe after taking a reading to another location. If the value increased, he would proceed in the same direction. If it decreased, he would move in another direction until a pattern is established. He would continue until the signal passes through a maximum. At this point he would probe around to locate the general boundaries of the septic tank. He would then mark the location, pack the equipment up, and refill the toilet bowl.

In a simpler embodiment, a homeowner would purchase a CD with a repeated audio frequency sweep, play it on a home stereo or boom box, placing the speaker on the toilet. He would then go outside and listen or feel for the earth vibrations.

It will be recognized that this operation would be simple enough for a homeowner or septic service to conduct with little or no required knowledge of the complexities of digital signal processing. It will also be recognized that a more professional version of the device could yield additional data for those skilled in the art.

What is claimed is:

1. A method comprising the steps of:
   (a) generating a prescribed acoustic wave wherein a frequency f of said acoustic wave matches at least one resonant mode of an underground device including a cavity for at least a time equal to 2/f;
   (b) acoustically injecting said acoustic wave into said underground device;
   (c) establishing a first time reference in a first clock, wherein said first clock governs the generation of said acoustic wave;
   (d) electronically detecting said acoustic wave, at a remote location in acoustic communication with said underground device through an earth path to produce a measurement of said acoustic wave;
   (e) establishing a second time reference in a second clock, wherein said second time reference of said second clock is synchronized with said first time reference of said first clock, and said second clock governs said measurement;
   (f) digitizing and storing a sequential series of measurements of said acoustic wave;
   (g) performing digital processing on said series of measurements, wherein said digital processing comprises cross correlating said series of measurements with a priori amplitude values of said prescribed acoustic wave to produce a result related to the intensity of said acoustic wave at said remote location; and
   (h) communicating said result to an operator.

2. The method of claim 1 wherein said underground device is a septic tank.

3. The method of claim 1 wherein said underground device is a fuel tank.

4. The method of claim 1 wherein said acoustically injecting is through a vent stack, cleanout, drain, or toilet.

5. The method of claim 1 wherein said first time reference and said second time reference are based at least in part on a broadcast time reference.

6. The method of claim 5 wherein the broadcast time reference is traceable to The National Institute of Standards and Technology.

7. The method of claim 1 wherein said electronically detecting is based at least in part on a geophone or an accelerometer.

8. The method of claim 1 wherein said result is used to locate said underground device.

9. The method of claim 1 further comprising a step of determining a time delay τ of said acoustic wave at said remote location.

10. The method of claim 1 further comprising a step of determining a transfer function g(f) of said acoustic wave.

11. The method of claim 10 further comprising a step of determining at least one characteristic of a physical system based at least in part on said transfer function g(f).

12. The method of claim 11 wherein said at least one characteristic of a physical system is a distance between a liquid level and a septic tank lid.

13. The method of claim 11 wherein said at least one characteristic of a physical system is at least one dimension of said underground device.

14. The method of claim 1 wherein said frequency f is a predefined sequence of tones.

15. The method of claim 14 wherein said predefined sequence of tones is a frequency sweep over a range of tones selected to pass through a plurality of resonant vibrational modes; and wherein said frequency sweep is periodically repeated.

* * * * *